(12) United States Patent
Magaki et al.

(10) Patent No.: US 8,775,033 B2
(45) Date of Patent: Jul. 8, 2014

(54) SHOVEL AND METHOD OF CONTROLLING SHOVEL

(75) Inventors: Hideto Magaki, Chiba (JP); Ryuji Shiratani, Chiba (JP); Jitsutaka Takeo, Chiba (JP)

(73) Assignee: Sumitomo(S.H.I.) Construction Machinery Co., Ltd., Tokyo (JP)

( * ) Notice: Subject to any disclaimer, the term of this patent is extended or adjusted under 35 U.S.C. 154(b) by 133 days.

(21) Appl. No.: 13/488,582

(22) Filed: Jun. 5, 2012

(65) Prior Publication Data

US 2012/0315119 A1 Dec. 13, 2012

(30) Foreign Application Priority Data

Jun. 7, 2011 (JP) .................................. 2011-127264

(51) Int. Cl.
| | | |
|---|---|---|
| E02F 3/43 | (2006.01) | |
| E02F 3/32 | (2006.01) | |
| E02F 9/20 | (2006.01) | |
| E02F 9/22 | (2006.01) | |
| B60K 25/02 | (2006.01) | |
| B60W 20/00 | (2006.01) | |
| B60K 6/46 | (2007.10) | |
| B60W 10/08 | (2006.01) | |
| B60W 30/188 | (2012.01) | |
| B60W 10/06 | (2006.01) | |

(52) U.S. Cl.
CPC ............. *E02F 9/2075* (2013.01); *E02F 9/2246* (2013.01); *B60K 25/02* (2013.01); *B60W 20/00* (2013.01); *B60K 6/46* (2013.01); *Y02T 10/6217* (2013.01); *B60W 10/08* (2013.01); *B60W 30/1888* (2013.01); *B60Y 2200/412* (2013.01); *Y02T 10/6286* (2013.01); *B60W 10/06* (2013.01)
USPC .............................. 701/50; 37/379; 180/65.26

(58) Field of Classification Search
None
See application file for complete search history.

(56) References Cited

U.S. PATENT DOCUMENTS

| | | | | |
|---|---|---|---|---|
| 7,086,226 | B2 * | 8/2006 | Oguri .............................. | 60/414 |
| 7,669,413 | B2 * | 3/2010 | Komiyama et al. ............. | 60/414 |
| 2002/0125052 | A1 | 9/2002 | Naruse et al. | |
| 2003/0226291 | A1 | 12/2003 | Naruse et al. | |
| 2011/0028268 | A1* | 2/2011 | Kang et al. ........................ | 477/3 |
| 2011/0098873 | A1* | 4/2011 | Koga et al. ...................... | 701/22 |
| 2012/0082536 | A1 | 4/2012 | Kawashima et al. | |
| 2013/0006457 | A1* | 1/2013 | Anders et al. ................... | 701/22 |

FOREIGN PATENT DOCUMENTS

| | | |
|---|---|---|
| JP | 09-224354 | 8/1997 |
| JP | 2001-173024 | 6/2001 |
| JP | 2002-275945 | 9/2002 |
| JP | 2003-028071 | 1/2003 |
| JP | 2004-011502 | 1/2004 |
| JP | 2005-083242 | 3/2005 |

(Continued)

*Primary Examiner* — Michael J Zanelli
(74) *Attorney, Agent, or Firm* — IPUSA, PLLC

(57) ABSTRACT

A shovel includes an engine; a hydraulic pump driven by the engine; an attachment including a boom, the attachment being driven with hydraulic fluid discharged by the hydraulic pump; a motor generator configured to assist driving by the engine; an electric power accumulating part configured to accumulate electric power generated by the motor generator; a motion state detecting part configured to detect the motion state of the attachment; and an assist control part configured to control the execution of an assist by the motor generator using the electric power accumulated in the electric power accumulating part. The assist control part is configured to cause the motor generator to assist the engine during a boom raising motion after an excavation motion.

18 Claims, 8 Drawing Sheets

(56) References Cited

FOREIGN PATENT DOCUMENTS

| | | |
|---|---|---|
| JP | 2009-174446 | 8/2009 |
| JP | 2009-174447 | 8/2009 |
| JP | 2010-37855 * | 2/2010 |
| JP | 2011-047210 | 3/2011 |
| WO | WO 2009/157511 | 12/2009 |
| WO | WO 2010/143628 | 12/2010 |

* cited by examiner

SHOVEL AND METHOD OF CONTROLLING SHOVEL

CROSS-REFERENCE TO RELATED APPLICATION

The present application is based upon and claims the benefit of priority of Japanese Patent Application No. 2011-127264, filed on Jun. 7, 2011, the entire contents of which are incorporated herein by reference.

BACKGROUND OF THE INVENTION

1. Field of the Invention

The present invention relates generally to shovels including a motor generator that assists driving by an engine and methods of controlling the same, and more particularly to a shovel including a motor generator that assists a boom raising operation and a method of controlling the same.

2. Description of the Related Art

A conventional hybrid shovel is known that includes an engine; a hydraulic pump driven by the engine; hydraulic actuators for an excavation attachment, driven with hydraulic fluid discharged by the hydraulic pump; and a motor generator configured to perform an assist operation and a generator operation. (See, for example, International Publication No. WO 2009/157511 A1.)

This hybrid shovel determines a target engine speed different from a current engine speed in accordance with an operating load on the engine due to the hydraulic pump, and causes the motor generator to perform an assist operation or a generator operation in order to attain the target engine speed.

In this manner, the hybrid shovel described in International Publication No. WO 2009/157511 A1 improves a fuel consumption rate not only in the case of a low operating load on the engine due to the hydraulic pump but also in the case of a high operating load on the engine due to the hydraulic pump.

SUMMARY OF THE INVENTION

According to an aspect of the embodiments, a shovel includes an engine; a hydraulic pump driven by the engine; an attachment including a boom, the attachment being driven with hydraulic fluid discharged by the hydraulic pump; a motor generator configured to assist driving by the engine; an electric power accumulating part configured to accumulate electric power generated by the motor generator; a motion state detecting part configured to detect a motion state of the attachment; and an assist control part configured to control execution of an assist by the motor generator using the electric power accumulated in the electric power accumulating part, wherein the assist control part is configured to cause the motor generator to assist the engine during a boom raising motion after an excavation motion.

According to an aspect of the embodiments, a method of controlling a shovel includes controlling a motor generator assisting driving of a hydraulic pump by an engine, the assisting using an electric power accumulated in an electric power accumulating part by the motor generator, wherein said controlling causes the motor generator to assist the engine during a motion of raising a boom included in an attachment using hydraulic fluid discharged by the hydraulic pump after an excavation motion.

The object and advantages of the embodiments will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

However, according to the hybrid shovel described in International Publication Pamphlet No. WO 2009/157511 A1, the motor generator is caused to perform an assist operation as a result of an increase in the operating load on the engine due to the hydraulic pump. Therefore, a temporary slowdown is inevitable in the movement of the excavation attachment during an excavating operation, so that an operator may feel tardiness of movement.

According to an aspect of the invention, a shovel may be provided whose operator does not feel tardiness in the operation of the attachment.

According to an aspect of the invention, a method of controlling such a shovel is provided.

A description is given, with reference to the accompanying drawings, of embodiments of the present invention.

[First Embodiment]

Figure 1:
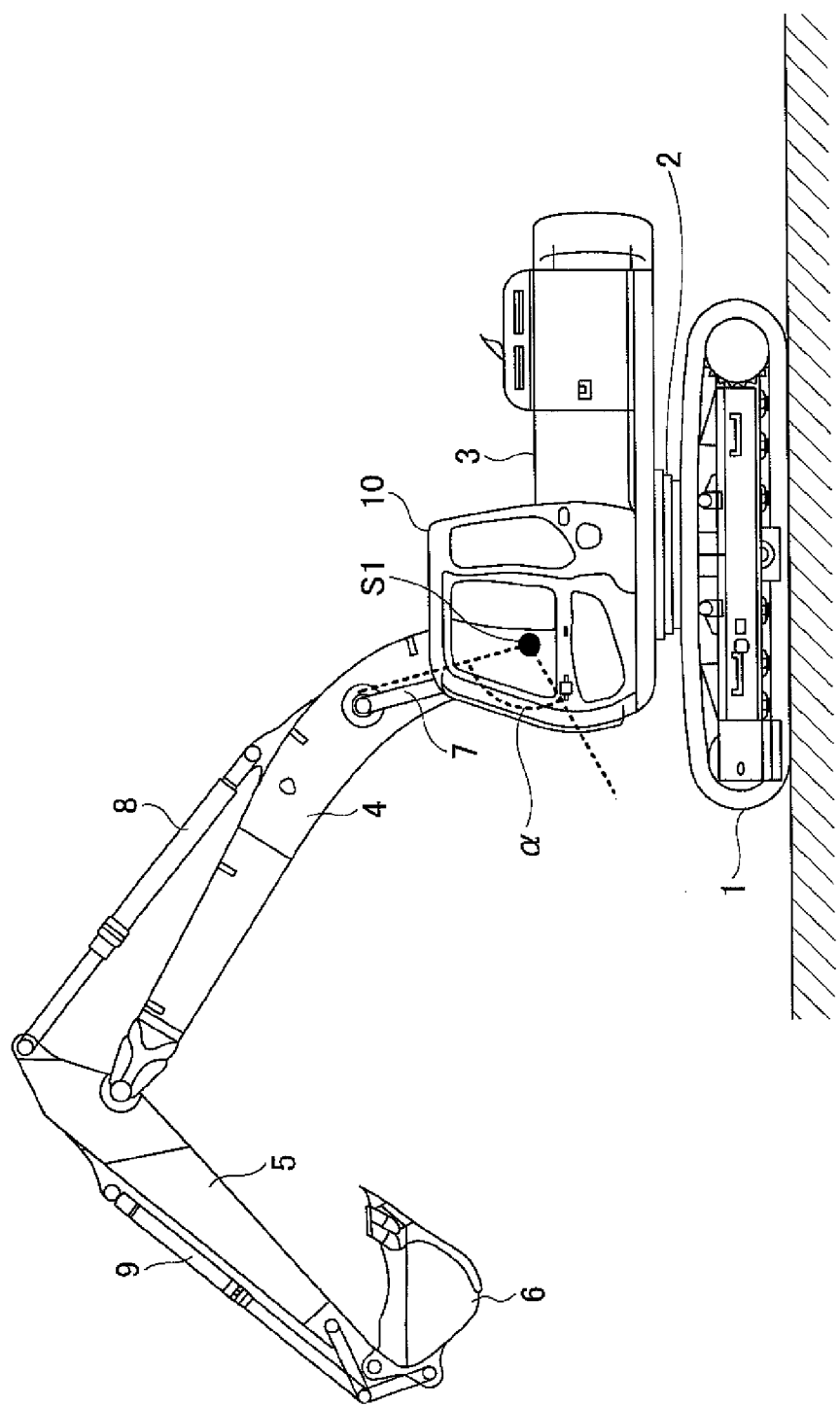
FIG. 1 is a side view of a shovel according to a first embodiment of the present invention.

FIG. 1 is a side view of a shovel according to a first embodiment of the present invention.

The shovel includes a lower-part traveling body 1 of a crawler type, a turning mechanism 2, and an upper-part turning body 3. The upper-part turning body 3 is so mounted on the lower-part traveling body 1 through the turning mechanism 2 as to freely turn.

The shovel further includes a boom 4, an arm 5, and a bucket 6. The boom 4 is attached to the upper-part turning body 3. The arm 5 is attached to the end of the boom 4. The bucket 6 as an end attachment is attached to the end of the arm 5. The boom 4, the arm 5, and the bucket 6 form an excavation attachment, which is an example of the attachment.

Figure 3A:
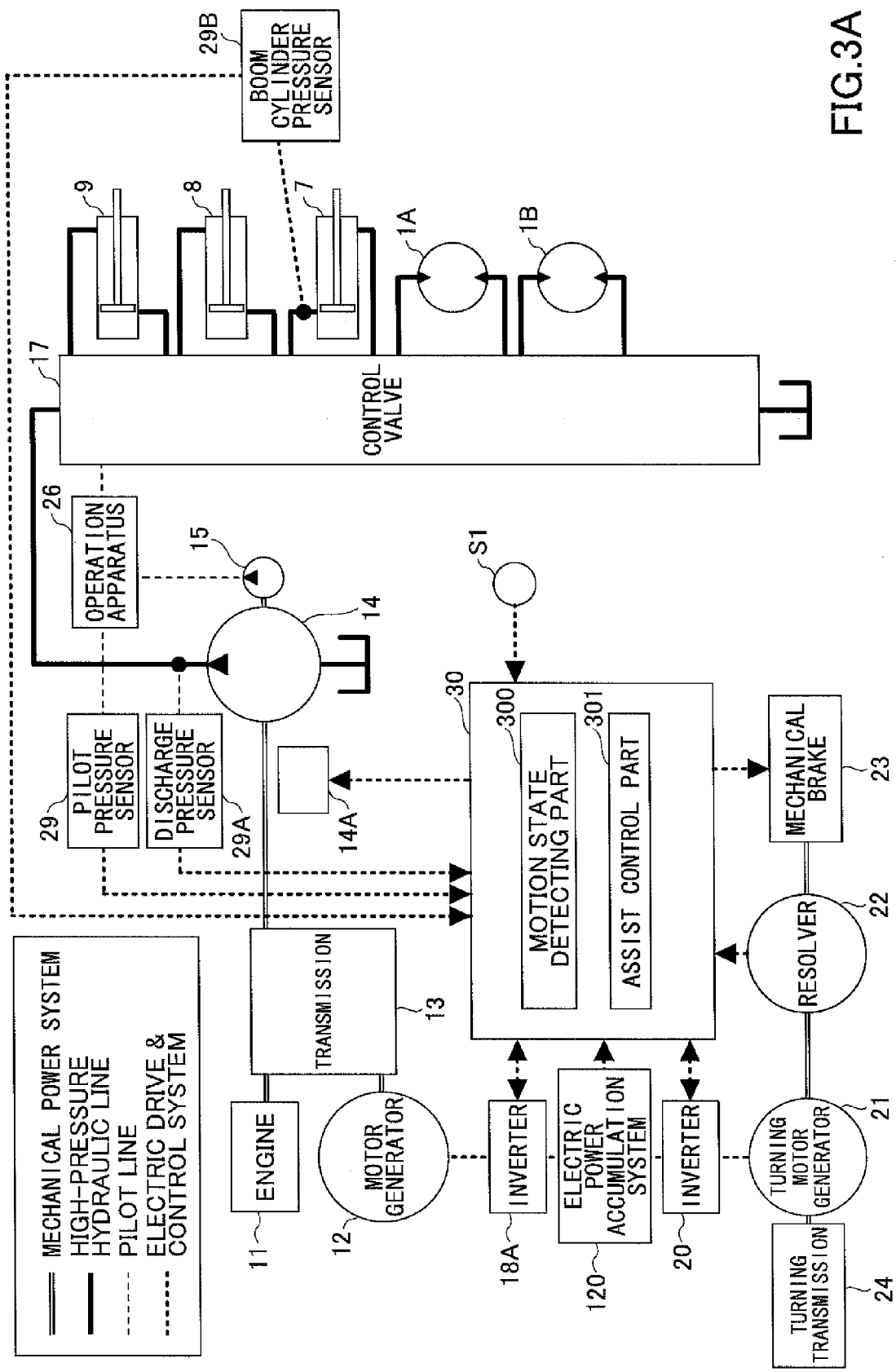
FIG. 3A is a block diagram illustrating a configuration of a drive system of the shovel according to the first embodiment.

The shovel further includes a boom cylinder 7, an arm cylinder 8, and a bucket cylinder 9, which hydraulically drive the boom 4, the arm 5, and the bucket 6, respectively. The shovel also includes a cabin 10 and power sources such as an engine 11 (FIG. 3A). The cabin 10 is provided on the upper-part turning body 3. The power sources are mounted in the upper-part turning body 3. In FIG. 1, the bucket 6 is illustrated as an end attachment. The bucket 6 may be replaced with a lifting magnet, a breaker, or a fork.

The boom 4 is supported to be vertically turnable relative to the upper-part turning body 3. A boom angle sensor S1 operating as a boom motion state detecting part is attached to the turning support part (joint) of the boom 4. A boom angle α, which is the angle of inclination of the boom 4 (the angle of rise of the boom 4 from its lowermost position [most lowered state]), may be detected with the boom angle sensor S1.

Figure 2:
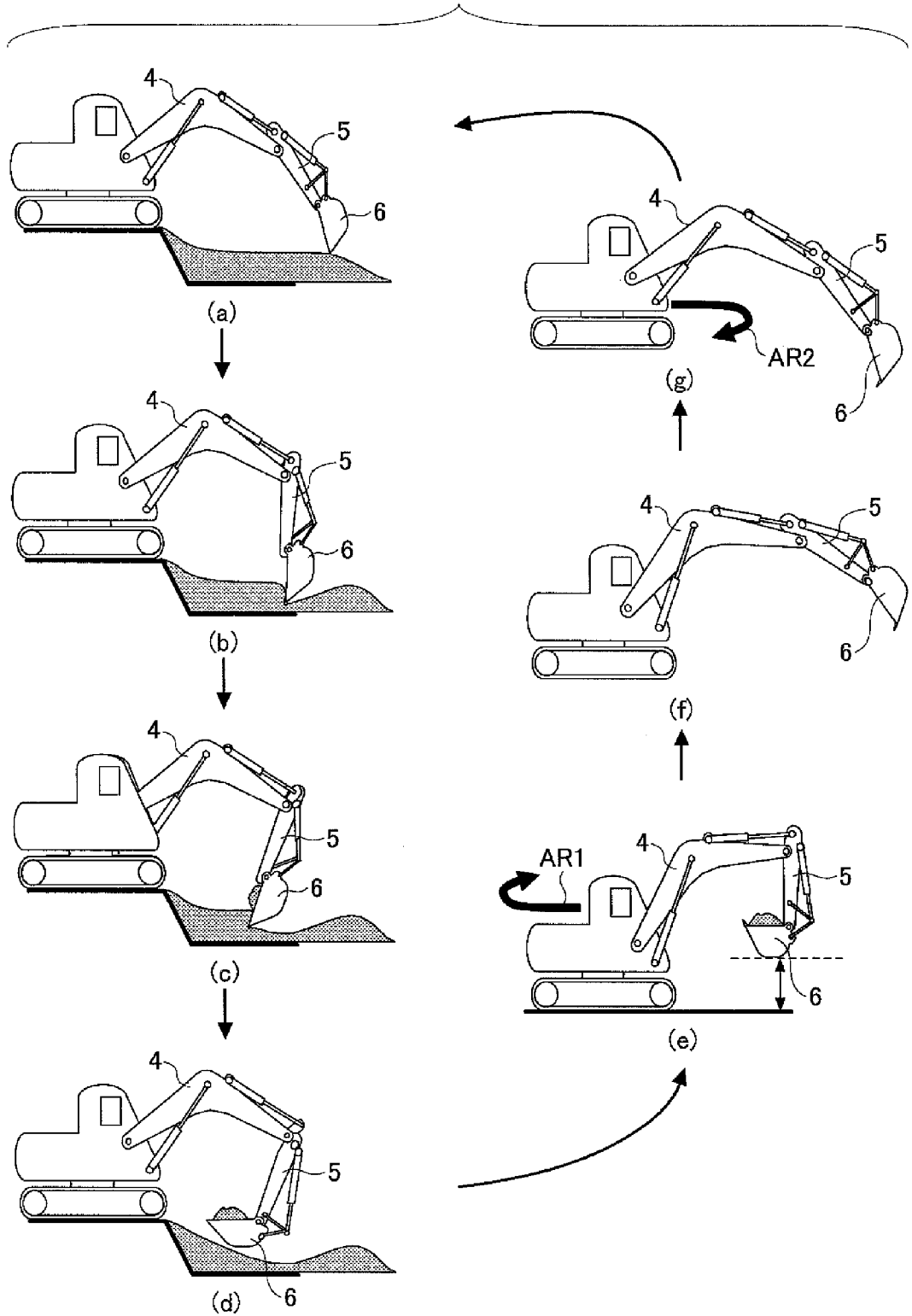
FIG. 2 illustrates changes in the motion state of an excavation attachment of the shovel according to the first embodiment.

Next, a description is given, with reference to FIG. 2, of an excavating and loading motion, which is a motion of the shovel.

First, as illustrated in (a) of FIG. 2, an operator turns the upper-part turning body 3, and lowers the boom 4 with the bucket 6 being positioned above an excavating (digging) position, the arm 5 being open, and the bucket 6 being open, so that the bucket 6 is lowered until the end of the bucket 6 is at a desired level above (at a desired vertical distance from) an object of excavating. Usually, the operator visually checks the position of the bucket 6 when turning the upper-part turning body 3 and lowering the boom 4. Further, in general, the turning of the upper-part turning body 3 and the lowering of the boom 4 are simultaneously performed. These motions are referred to as a boom turning and lower motion, and this motion section is referred to as a boom turning and lowering motion section.

When the operator determines that the end of the bucket 6 reaches the desired level, the operator closes the arm 5 so that the arm 5 is substantially perpendicular to the surface of earth, as illustrated in (b) of FIG. 2. As a result, the earth is dug for a predetermined depth, and is scraped with the bucket 6 until the arm 5 is substantially perpendicular to the surface of the earth. Next, the operator further closes the arm 5 and the bucket 6 as illustrated in (c) of FIG. 2, and closes the bucket 6 so that the bucket 6 is substantially perpendicular to the arm 5 as illustrated in (d) of FIG. 2. That is, the operator closes the bucket 6 until the upper edge of the bucket 6 is substantially horizontal, and the scooped earth is accommodated in the bucket 6. This motion is referred to as an excavating motion, and this motion section is referred to as an excavating motion section.

Next, when the operator determines that the bucket 6 is closed to be substantially perpendicular to the arm 5, the operator raises the boom 4 with the bucket 6 being closed so that the bottom of the bucket 6 is at a desired level above (at a desired vertical distance from) the surface of the earth as illustrated in (e) of FIG. 2. This motion is referred to as a boom raising motion, and this motion section is referred to as a boom raising motion section. Subsequently to or simultaneously with this motion, the operator turns the upper-part turning body 3, and turns and moves the bucket 6 to an earth dumping position as indicated by arrow AR1 in (e) of FIG. 2. This motion including the boom raising motion is referred to as a boom raising and turning motion, and this motion section is referred to as a boom raising and turning motion section.

The boom 4 is raised until the bottom of the bucket 6 is at the desired level because, for example, the bucket 6 collides with the bed of a dump truck unless the bucket 6 is raised to be higher than the level of the bed at the time of dumping earth onto the bed.

Next, when the operator determines that the boom raising and turning motion is completed, the operator opens the arm 5 and the bucket 6 to dump out earth inside the bucket 6 as illustrated in (f) of FIG. 2. This motion is referred to as a dumping motion, and this motion section is referred to as a dumping operation motion. In the dumping motion, only the bucket 6 may be opened to dump out earth.

Next, when the operator determines that the dumping motion is completed, the operator turns the upper-part turning body 3 as indicated by arrow AR2 to move the bucket 6 to immediately above the excavating position as illustrated in (g) of FIG. 2. At this point, at the same time with the turning, the operator lowers the boom 4 so that the bucket 6 is lowered to a desired level above the object of excavating. This motion is part of the boom turning and lowering motion illustrated in (a) of FIG. 2. The operator lowers the bucket 6 to the desired level as illustrated in (a) of FIG. 2, and again performs the excavating motion and subsequent motions.

The operator proceeds with excavation and loading, repeatedly executing a cycle composed of the above-described "boom turning and lowering motion," "excavating motion," "boom raising and turning motion," and "dumping motion."

FIG. 3A is a block diagram illustrating a configuration of a drive system of the shovel according to this embodiment. In FIG. 3A, a double line, a solid line, a broken line, and a dotted line indicate a mechanical power system, a high-pressure hydraulic line, a pilot line, and an electric drive and control system, respectively.

The drive system of the shovel includes an engine 11, a motor generator 12, a transmission 13, a main pump 14, a regulator 14A, a pilot pump 15, a control valve 17, an inverter 18A, an electric power accumulation system 120, a turning electric mechanism, an operation apparatus 26, a pilot pressure sensor 29, a discharge pressure sensor 29A, a boom cylinder pressure sensor 29B, and a controller 30.

The engine 11 is the drive source of the shovel, and so operates as to maintain a predetermined engine speed, for example. The output shaft of the engine 11 is connected to the input shaft of the main pump 14 and the input shaft of the pilot pump 15 via the transmission 13.

The motor generator 12 selectively executes a generator operation, in which the motor generator 12 is driven by the engine 11 to rotate and generate electric power, and an assist operation, in which the motor generator 12 rotates with electric power (energy) stored (accumulated) in the electric power accumulation system 120 to assist the engine 11 in outputting.

The transmission 13 is a speed-changing mechanism including two input shafts and one output shaft. One of the input shafts is connected to the output shaft of the engine 11, and the other one of the input shafts is connected to the rotating shaft of the motor generator 12. The output shaft of the transmission 13 is connected to the rotating shaft of the main pump 14.

The main pump 14 supplies the control valve 17 with hydraulic fluid via the high-pressure hydraulic line, and is, for example, a variable displacement swash plate type hydraulic pump.

The regulator 14A controls the quantity of discharge of the main pump 14. For example, the regulator 14A controls the quantity of discharge of the main pump 14 by adjusting the tilting angle of the swash plate of the main pump 14 in accordance with the discharge pressure of the main pump 14 and a control signal from the controller 30.

The pilot pump 15 supplies various hydraulic controllers with hydraulic fluid via the pilot line, and is, for example, a fixed displacement hydraulic pump.

The control valve 17 is a hydraulic controller that controls a hydraulic system in the shovel. The control valve 17 selectively supplies hydraulic fluid received from the main pump 14 to one or more of, for example, the boom cylinder 7, the arm cylinder 8, the bucket cylinder 9, a traveling hydraulic motor 1A (right), and a traveling hydraulic motor 1B (left). Hereinafter, the boom cylinder 7, the arm cylinder 8, the bucket cylinder 9, the traveling hydraulic motor 1A (right), and the traveling hydraulic motor 1B (left) are collectively referred to as "hydraulic actuators."

The inverter 18A converts alternating current (AC) electric power and direct current (DC) electric power to each other. The inverter 18A converts AC electric power generated by the motor generator 12 into DC electric power, and stores (accumulates) the DC electric power in the electric power accumulation system 120 (a charging operation). The inverter 18A converts the DC electric power stored in the electric power accumulation system 120 into AC electric power, and supplies the motor generator 12 with the AC electric power (a discharge operation). Further, the inverter 18A controls the stopping, switching, or starting of the charging operation and the discharge operation in accordance with a control signal output by the controller 30, and outputs information on the charging operation and the discharge operation to the controller 30.

The electric power accumulation system 120 stores (accumulates) DC electric power (energy). The electric power accumulation system 120 includes, for example, a capacitor serving as an electric power accumulation part, a step-up/step-down converter, and a DC bus (none of which is graphically illustrated). The DC bus controls the transfer of electric power between the capacitor and the motor generator 12. The capacitor includes a capacitor voltage detecting part (not graphically illustrated) that detects the voltage value of the capacitor and a capacitor current detecting part (not graphically illustrated) that detects the current value of the capacitor. The capacitor voltage detecting part and the capacitor current detecting part output the detected voltage value and the detected current value, respectively, of the capacitor to the controller 30. As the electric power accumulation part, a rechargeable battery capable of being discharged and recharged, such as a lithium ion battery, a lithium ion capacitor, or a power supply in another mode enabling transfer of electric power may also be used in place of the capacitor.

The turning electric mechanism includes an inverter 20, a turning motor generator 21, a resolver 22, a mechanical brake 23, and a turning transmission 24.

The inverter 20 converts AC electric power and DC electric power to each other. The inverter 20 converts AC electric power generated by the turning motor generator 21 into DC electric power, and stores (accumulates) the DC electric power in the electric power accumulation system 120 (a charging operation). The inverter 20 converts the DC electric power stored in the electric power accumulation system 120 into AC electric power, and supplies the turning motor generator 21 with the AC electric power (a discharge operation). Further, the inverter 20 controls the stopping, switching, or starting of the charging operation and the discharge operation in accordance with a control signal output by the controller 30, and outputs information on the charging operation and the discharge operation to the controller 30.

The turning electric motor 21 selectively executes a power running operation, in which the turning motor generator 21 rotates with electric power stored in the electric power accumulation system 120 to turn the turning mechanism 2, and a regenerative operation, in which the turning motor generator 21 converts the kinetic energy of the turning mechanism 2 due to its turning into electrical energy.

The resolver 22 detects the turning speed of the turning mechanism 2, and outputs the detected value to the controller 30.

The mechanical brake 23, which applies the brakes on the turning mechanism 2, mechanically prevents the turning mechanism 2 from turning in accordance with a control signal output by the controller 30.

The turning transmission 24 is a speed-changing mechanism including an input shaft and an output shaft. The turning transmission 24 has the input shaft connected to the rotating shaft of the turning motor generator and has the output shaft connected to the rotating shaft of the turning mechanism 2.

The operation apparatus 26 is used by the operator to operate the hydraulic actuators. The operation apparatus 26 supplies hydraulic fluid received from the pilot pump 15 via the pilot line to the pilot ports of flow control valves corresponding to the hydraulic actuators. The pressure (pilot pressure) of hydraulic fluid supplied to each of the pilot ports corresponds to the direction of operation and the amount of operation of a lever or pedal (not graphically illustrated) of the operation apparatus 26 corresponding to the hydraulic actuator corresponding to the pilot port.

The pilot pressure sensor 29 is an operating state detecting part that detects the contents of operations performed by the operator using the operation apparatus 26. For example, the pilot pressure sensor 29 detects the directions of operation and the amounts of operation of the levers and/or pedals of the operation apparatus 26 corresponding to the hydraulic actuators in the form of pressure, and outputs the detected values to the controller 30. The contents of operations of the operation apparatus 26 may also be detected using a sensor other than a pressure sensor.

The discharge pressure sensor 29A is a load pressure sensor that detects an operational load applied to the attachment. For example, the discharge pressure sensor 29A detects the discharge pressure of the main pump 14, and outputs the detected value to the controller 30.

The boom cylinder pressure sensor 29B is another load pressure sensor that detects an operational load applied to the attachment. For example, the boom cylinder pressure sensor 29B detects a pressure in the bottom-side chamber of the boom cylinder 7, and outputs the detected value to the controller 30.

Figure 3B:
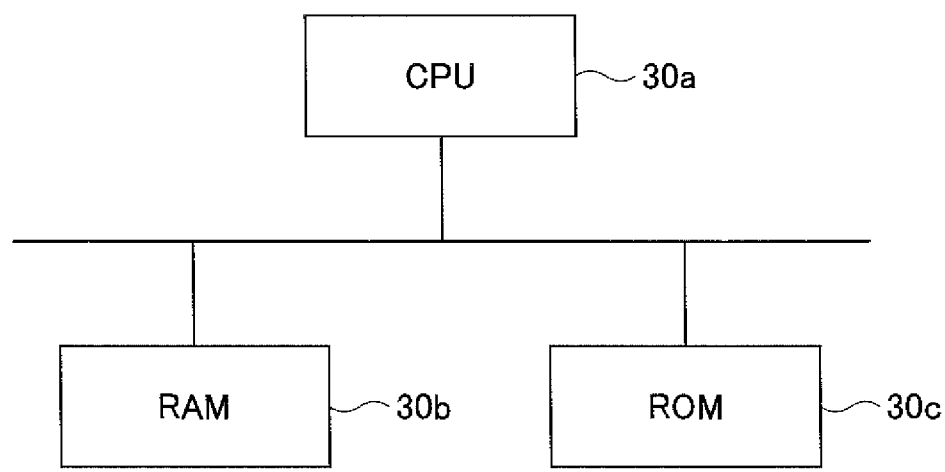
FIG. 3B is a schematic block diagram illustrating a hardware configuration of a controller according to the first embodiment.

The controller 30 is a control unit that controls the shovel. FIG. 3B is a schematic block diagram illustrating a hardware configuration of the controller 30. The controller 30 is constituted of a computer including a processor such as a central processing unit (CPU) 30a, a random access memory (RAM) 30b, and a read-only memory (ROM) 30c. Further, the controller 30 reads programs corresponding to a motion state detecting part 300 and an assist control part 301, respectively, from the ROM 30c, loads the read programs into the RAM 30b, and causes the CPU 30a to execute processes corresponding to the respective programs.

For example, the controller 30 receives the output detected values of the boom angle sensor S1 (FIG. 1), the inverter 18A, the inverter 20, the resolver 22, the pilot pressure sensor 29, the discharge pressure sensor 29A, the boom cylinder pressure sensor 29B, and the electric power accumulation system 120. The controller 30 executes the respective processes of the motion state detecting part 300 and the assist control part 301 based on the detected values. Thereafter, the controller 30 suitably outputs control signals corresponding to the results of the processes of the motion state detecting part 300 and the assist control part 301 to the inverter 18A and the inverter 20.

The motion state detecting part 300 is a functional element that detects the motion state of the attachment. For example, the motion state detecting part 300 detects predetermined motions of the excavation attachment based on the outputs of various sensors.

For example, the motion state detecting part 300 detects a boom raising motion based on the outputs of the boom angle sensor S1 and the pilot pressure sensor 29, and detects a high load motion subsequent to an excavating motion based on the output of the boom cylinder pressure sensor 29B. Thus, the motion state detecting part 300 detects a boom raising motion for which assisting by the motor generator 12 is presumed to be necessary (hereinafter referred to as "high-load boom raising motion") among the boom raising motions.

For example, the motion state detecting part 300 detects the start of a high-load boom raising motion when the pilot pressure of a boom operating lever (not graphically illustrated) in a boom raising direction, PL, (hereinafter referred to as "boom raising pilot pressure PL) is more than or equal to a predetermined pressure $PL_{TH}$; the boom angle α is within a predetermined angle range ($\alpha 1 \le \alpha \le \alpha 2$); and the bottom pressure of the boom cylinder 7, PC, is more than or equal to a predetermined pressure $PC_{TH}$. Here, $PL_{TH}$, α1, α2, and $PC_{TH}$ are values preset on a shovel type basis, where α1 is an angle preset based on whether the operation is deep excavation or whether the end of the bucket 6 is in sight at the time of excavation, and α2 is an angle preset based on whether the operation is lifting or whether the end of the bucket 6 is in sight at an operating time.

Further, as the detection value of a load pressure sensor, the motion state detecting part 300 may use a value detected by the discharge pressure sensor 29A instead of a value detected by the boom cylinder pressure sensor 29B. In this case, the motion state detecting part 300 detects the start of a high-load boom raising motion when the boom raising pilot pressure PL is more than or equal to the predetermined pressure PITH; the boom angle α is within the predetermined angle range ($\alpha 1 \le \alpha \le \alpha 2$); and the discharge pressure of the main pump 14, P, is more than or equal to a predetermined pressure $P_{TH}$.

Further, as the detection value of the operating state detecting part, the motion state detecting part 300 may use an electrical signal output from the operation apparatus 26 instead of an electrical signal output from the pilot pressure sensor 29 if the operation apparatus 26 is an electric type.

The motion state detecting part 300 may also detect the start of a high-load boom raising motion based only on the output of the boom angle sensor S1 or based on the output of the boom angle sensor S1 and the output of the discharge pressure sensor 29A or the boom cylinder pressure sensor 29B.

Further, the motion state detecting part 300 may also detect the start of a high-load boom raising motion by additionally considering at least one of the output of an atm angle sensor (not graphically illustrated) and the output of a bucket angle sensor (not graphically illustrated). In this case, the motion state detecting part 300 may detect the start of a high-load boom raising motion if the body position of the shovel is in a predetermined state.

Further, the motion state detecting part 300 may detect the start of a high-load boom raising motion by additionally considering at least one of the output of an arm cylinder pressure sensor (not graphically illustrated) and the output of a bucket cylinder pressure sensor (not graphically illustrated). In this case, it is possible to allow the motion state detecting part 300 to detect the start of a high-load boom raising motion after determining with more accuracy that a predetermined operational load is imposed on the attachment.

Further, the motion state detecting part 300 may detect the start of a high-load boom raising motion by additionally considering at least one of the output of an arm pilot pressure sensor (not graphically illustrated), the output of a bucket pilot pressure sensor (not graphically illustrated), and the output of a turning pilot pressure sensor (not graphically illustrated). In this case, it is possible to allow the motion state detecting part 300 to detect the start of a high-load boom raising motion if there is a motion of the boom 4 in combination with at least one of the turning mechanism 2, the arm 5, and the bucket 6.

In response to detection of the start of a high-load boom raising motion, the motion state detecting part 300 outputs a control signal indicating the detection to the assist control part 301.

The assist control part 301 is a functional element that controls execution of the assist operation by the motor generator 12. For example, the assist control part 301 determines whether to start or whether to end the assist operation by the motor generator 12 in accordance with the detection result of the motion state detecting part 300.

For example, the assist control part 301 causes the motor generator 12 to start the assist operation in response to detection of the start of a high-load boom raising motion by the motion state detecting part 300.

Thus, the assist control part 301 causes the motor generator 12 to start the assist operation before the rising speed of the boom 4 is restricted during the boom raising operation.

Further, when the motion state detecting part 300 detects the completion of the high-load boom raising operation, the assist control part 301 causes the motor generator 12 to end the assist operation immediately or after passage of a predetermined period of time after the detection.

The assist control part 301 may also cause the motor generator 12 to end the assist operation in response to detection of the start or completion of another motion of the excavation attachment, such as the boom raising and turning motion, the dumping motion, or the boom turning and lowering motion, after the start of the assist operation.

Figure 4:
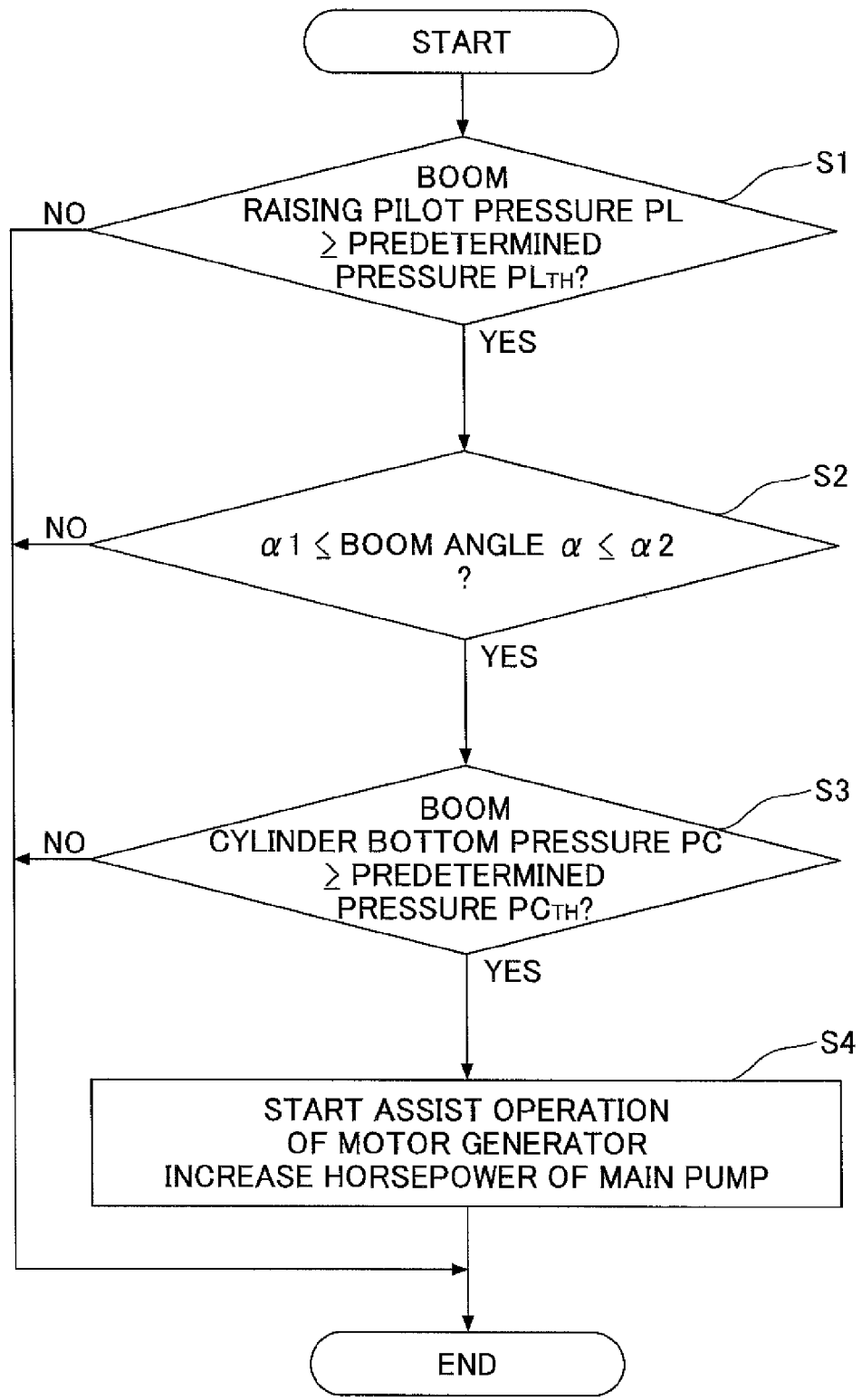
FIG. 4 is a flowchart illustrating a flow of an assist start determining process according to the first embodiment.

Here, a description is given, with reference to FIG. 4, of a flow of the process of determining the necessity of the assist operation of the motor generator 12 by the controller 30 (hereinafter referred to as "assist start determining process"). FIG. 4 is a flowchart illustrating a flow of the assist start determining process. It is assumed that the assist start determining process is repeatedly executed with a predetermined control period (at predetermined intervals) during the operation of the shovel.

First, in step S1, the controller 30 compares the boom raising pilot pressure PL, which is a value detected by the pilot pressure sensor 29, and the predetermined pressure $PL_{TH}$, using the motion state detecting part 300.

If the controller 30 determines that the boom raising pilot pressure PL is less than the predetermined pressure $PL_{TH}$ (NO in step S1), the controller 30 determines that there is no need for assisting by the motor generator 12, and ends the assist start determining process of this time.

If the controller 30 determines that the boom raising pilot pressure PL is more than or equal to the predetermined pressure $PL_{TH}$ (YES in step S1), in step S2, the controller 30 determines, using the motion state detecting part 300, whether the boom angle α, which is a value detected by the boom angle sensor S1, is within the predetermined angle range ($\alpha 1 \le \alpha \le \alpha 2$).

If the controller 30 determines that the boom angle α is not within the predetermined angle range (α1≤α≤α2) (NO in step S2), the controller 30 determines that there is no need for assisting by the motor generator 12, and ends the assist start determining process of this time.

If the controller 30 determines that the boom angle α is within the predetermined angle range (α1≤α≤α2) (YES in step S2), in step S3, the controller 30 compares the bottom pressure PC, which is a value detected by the boom cylinder pressure sensor 29B, with the predetermined pressure $PC_{TH}$, using the motion state detecting part 300.

If the controller 30 determines that the bottom pressure PC is less than the predetermined pressure $PC_{TH}$ (NO in step S3), the controller 30 determines that the operational load is too low to require assisting by the motor generator 12, and ends the assist start determining process of this time.

If the controller 30 determines that the bottom pressure PC is more than or equal to the predetermined pressure $PC_{TH}$ (YES in step S3), in step S4, the controller 30 causes the motor generator 12 to start the assist operation, and controls the regulator 14A to increase the horsepower of the main pump 14, using the assist control part 301. The controller 30 may also detect the discharge pressure of the main pump 14, P, in place of the bottom pressure of the boom cylinder 7, PC, and cause the motor generator 12 to start the assist operation in response to determining that the discharge pressure P is more than or equal to the predetermined pressure $P_{TH}$.

Thus, the controller 30 causes the motor generator 12 to start the assist operation to increase the torque provided to the input shaft of the main pump 14, and controls the regulator 14A to increase the quantity of discharge of the main pump 14, thereby increasing the horsepower of the main pump 14. Further, the controller 30 ends the assist start determining process of this time, and thereafter executes another assist start determining process in the next control period.

The determination as to whether the boom raising pilot pressure PL is more than or equal to the predetermined pressure $PL_{TH}$, the determination as to whether the boom angle α is within the predetermined angle range, and the determination as to whether the bottom pressure PC is more than or equal to the predetermined pressure $PC_{TH}$ may be performed in random order, and the three determinations may be simultaneously performed.

Figure 5:
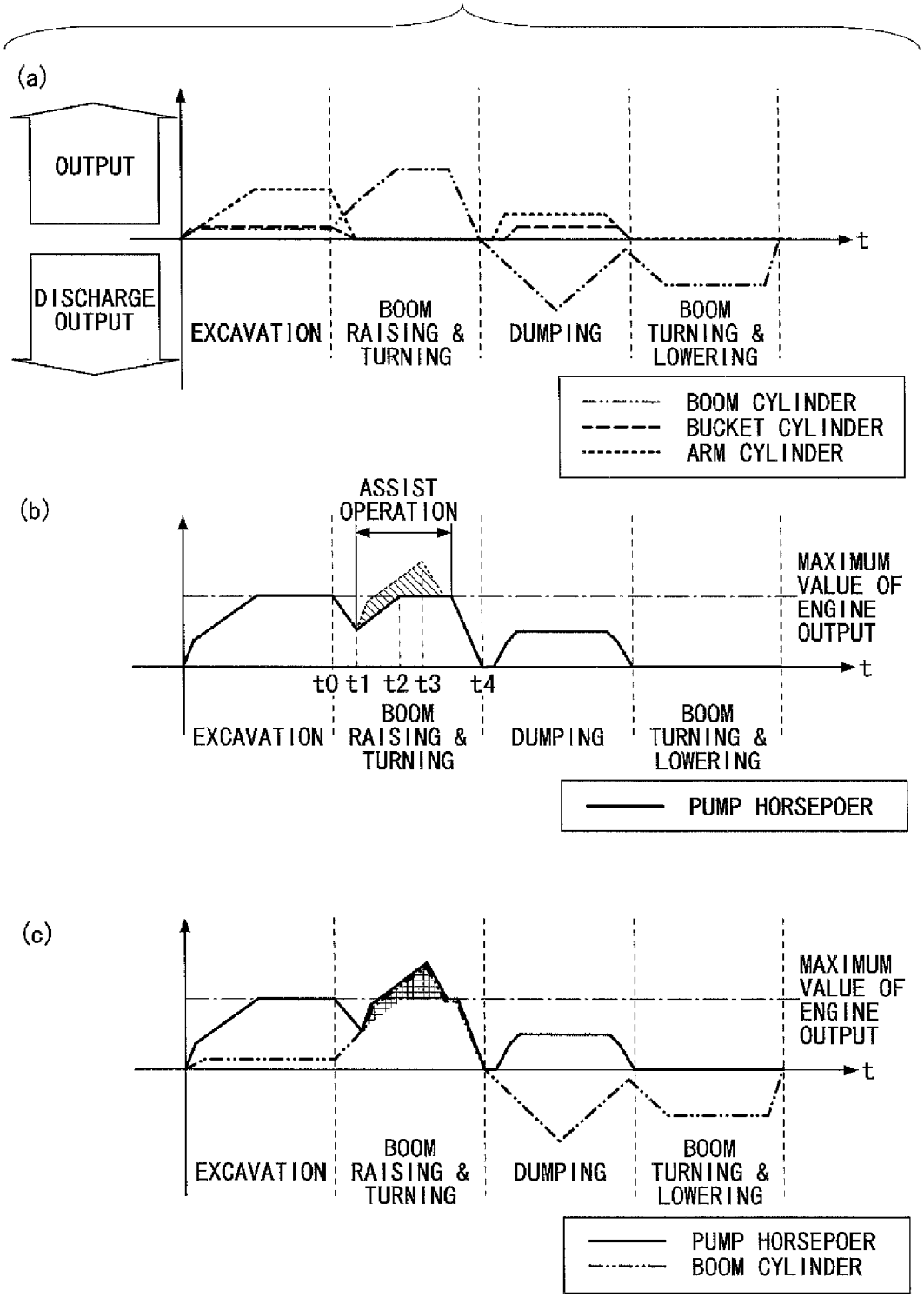
FIG. 5 illustrates changes in the outputs and the discharge outputs of individual hydraulic actuators when the excavation attachment performs a series of motions according to the first embodiment.

Here, a description is given, with reference to FIG. 5, of an effect in the case where the assist operation is performed by the motor generator 12 in the boom raising and turning motion section.

FIG. 5 illustrates changes in the outputs and the discharge outputs of individual hydraulic actuators when the excavation attachment performs a series of motions. Here, the "outputs" mean outputs necessary to cause the individual hydraulic actuators to operate, and the "discharge outputs" mean the outputs generated by the individual hydraulic actuators.

In FIG. 5, (a) illustrates changes in the outputs of the boom cylinder 7, the arm cylinder 8, and the bucket cylinder 9 and the discharge output of the boom cylinder 7. In FIG. 5, (a) illustrates changes in the case without the assist operation by the motor generator 12. In FIG. 5, (b) illustrates changes (indicated by a solid line) in the minimum required output of the main pump 14 (pump horsepower), which covers the total output (totaling the outputs) of the hydraulic actuators in (a). In (b) of FIG. 5, changes in the output of the main pump 14 in the case of performing the assist operation by the motor generator 12 are additionally indicated by a dotted line. In FIG. 5, (c) illustrates changes in the pump horsepower and changes in the output and the discharge output of the boom cylinder 7 in the case of performing the assist operation by the motor generator 12 in the boom raising and turning motion section.

First, a description is given, with reference to (a) and (b) of FIG. 5, of the case of performing no assist operation by the motor generator 12.

As illustrated in (a) and (b) of FIG. 5, once the excavation motion is started, the pump horsepower increases with the progress of the excavation motion, mainly covering the output of the arm cylinder 8, and reaches the maximum value of the engine output.

In response to the start of the boom raising and turning motion at Time t0, the output of the arm cylinder 8 decreases, so that the pump horsepower temporarily decreases. Thereafter, in response to the output of the boom cylinder 7 becoming a main target of covering by the pump horsepower at Time t1, the pump horsepower again increases with the progress of the boom raising and turning motion. Then, at Time t2, the horsepower reaches the maximum value of the engine output. In this case, since the pump horsepower is prevented from being more than the maximum value of the engine output, the output of the boom cylinder 7 is restricted. Therefore, the rising speed of the boom 4 is restricted. Thereafter, once the boom 4 is raised high enough to perform the dumping operation, the output of the boom cylinder 7 decreases. Therefore, the pump horsepower also decreases with the decrease of the output of the boom cylinder 7. An arm operating lever and a bucket operating lever are not operated during the boom raising and turning motion. Therefore, the outputs of the arm cylinder 8 and the bucket cylinder 9 decreases in response to the start of the boom raising and turning operation.

Next, when the operator performs an arm opening operation and a bucket opening operation by operating the arm operating lever and the bucket operating lever, the dumping motion is started. At this point, the operator performs a boom lowering operation by operating the boom operating lever. A dead load is applied to the boom cylinder 7 by the boom lowering motion of the boom 4, so that the boom cylinder 7 generates a discharge output. Therefore, the pump horsepower mainly covers the outputs of the arm cylinder 8 and the bucket cylinder 9. The outputs of the arm cylinder 8 and the bucket cylinder 9 increase after the start of the dumping operation, continue to be substantially constant values, and thereafter decrease. During the dumping motion, the pump horsepower does not reach the maximum value of the engine output, and decreases toward the end (completion) of the dumping motion.

When the dumping motion ends, the operator operates a turning lever and the boom operating lever to make a turning motion and the boom lowering motion toward the excavation position. Thereby, the operator starts the boom turning and lowering motion.

Here, a description is given, with reference to (b) and (c) of FIG. 5, of the case of causing the motor generator 12 to perform the assist operation in part of the boom raising and turning motion section in order to increase the pump horsepower beyond the maximum value of the engine output.

In (b) and (c) of FIG. 5, solid lines indicate changes in the pump horsepower. In (b) of FIG. 5, a part hatched with oblique lines indicates an increase in the pump horsepower due to the assist operation of the motor generator 12. Further, in (c) of FIG. 5, the pump horsepower is a value including the output of the motor generator 12, and a cross-hatched part illustrates an increase in the output of the boom cylinder 7 relative to the output of the boom cylinder 7 in the case of performing no assist operation during the boom raising and turning motion.

The motor generator 12 starts the assist operation at Time t1. With this, the controller 30 controls the regulator 14A to increase the pump horsepower. The boom angle α is greater than a predetermined angle α2 at Time t3. The pump horsepower is caused to gradually decrease after Time t3 by gradually decreasing the quantity of discharge of the main pump 14, Q, by controlling the regulator 14A. Then, the motor generator 12 ends the assist operation at a time when a predetermined period of time has passed since Time t3.

Thus, the pump horsepower increases beyond the maximum value of the engine output during the boom raising and turning motion because of the assist operation of the motor generator 12.

As a result, the controller 30 allows the output of the boom cylinder 7 (an output necessary to cause the boom cylinder 7 to operate) to increase beyond the maximum value of the engine output during the boom raising and turning motion, so that it is possible to prevent the rising speed of the boom 4 from being limited by the speed determined by the maximum value of the engine output.

Figure 6:
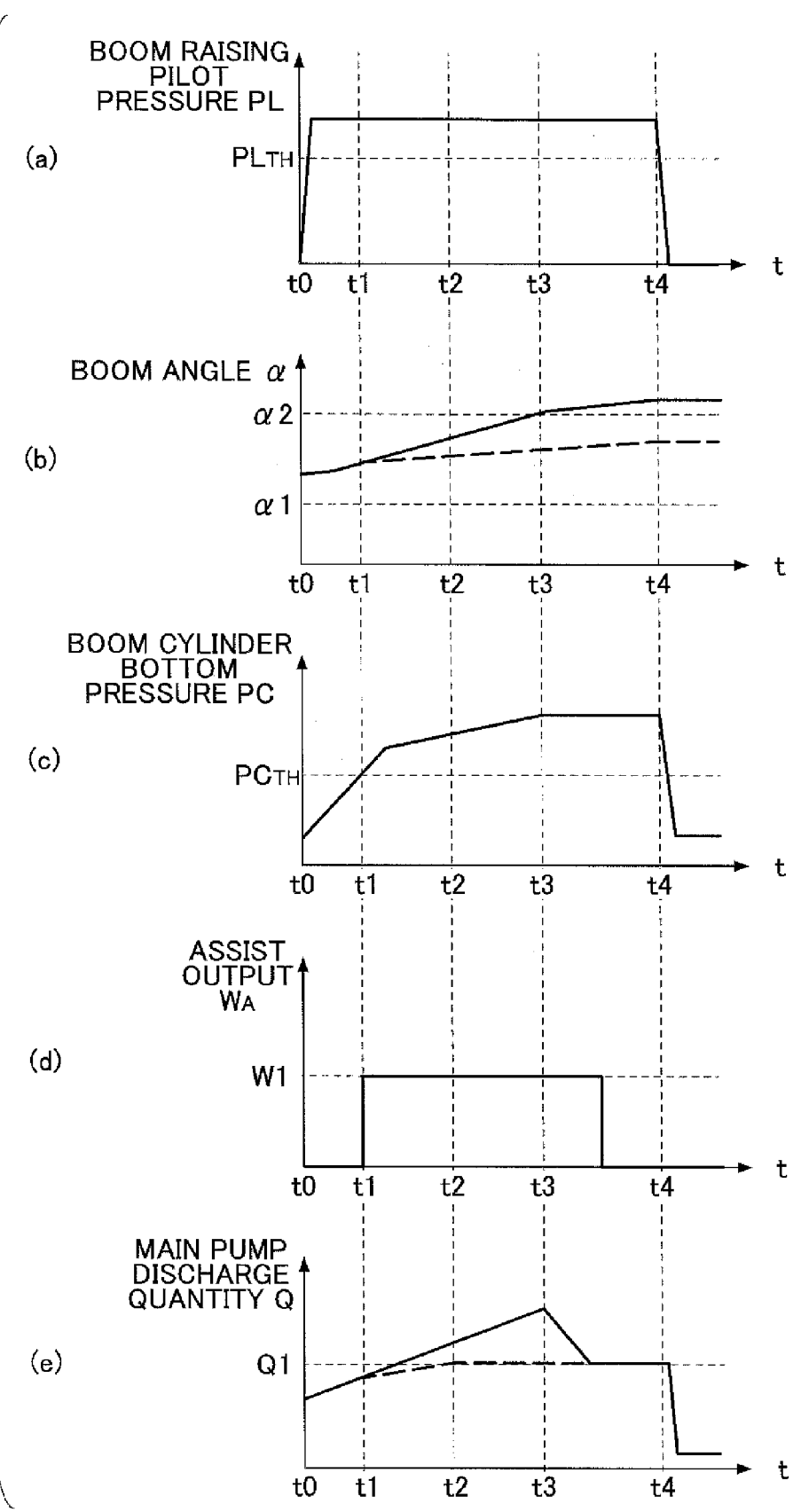
FIG. 6 illustrates the temporal changes of a boom raising pilot pressure, a boom angle, the bottom pressure of a boom cylinder, the assist output of a motor generator, and the quantity of discharge of a main pump 14 in the case of causing an assist operation to be started according to the first embodiment.

Next, a description is given, with reference to FIG. 6, of the temporal changes of the boom raising pilot pressure PL (see (a)), the boom angle α (see (b)), the bottom pressure of the boom cylinder 7, PC, (see (c)), the assist output of the motor generator 12, WA, (see (d)), and the quantity of discharge of the main pump 14, Q, (see (e)) in the case of the controller 30 causing the motor generator 12 to start the assist operation. Here, Time t0 through Time t4 in FIG. 6 correspond to Time t0 through Time t4 in (b) of FIG. 5. Further, the changes indicated by solid lines in (a) through (e) of FIG. 6 illustrate an effect in the case of causing the motor generator 12 to perform the assist operation. Further, the changes indicated by broken lines in (b) and (e) of FIG. 6 illustrate an effect in the case of not causing the motor generator 12 to perform the assist operation.

When the boom operating lever is operated in a boom raising direction (a direction to raise the boom 4) at Time t0, the boom raising pilot pressure PL becomes more than the predetermined pressure $PL_{TH}$, and the boom angle α, the bottom pressure PC, and the quantity of discharge Q start to increase. The boom angle α has already been within the predetermined angle range ($α1 \leq α \leq α2$).

In the case where the assist operation is not started at Time t1, as indicated by a broken line in (e) of FIG. 6, the quantity of discharge Q increases up to Q1 at an increase rate lower than the increase rate of the case of starting the assist operation by controlling the regulator 14A until the pump horsepower reaches the maximum value of the engine output (that is, until Time t2). However, the quantity of discharge Q is limited to Q1 after the pump horsepower reaches the maximum value of the engine output (that is, after Time t2). As a result, the rate of increase of the boom angle α is restricted after Time t1 to slowly increase until Time t4 when the boom operating lever is operated in a direction of a neutral position as indicated by a broken line in (b) of FIG. 6.

According to this embodiment, when the bottom pressure PC becomes more than or equal to the predetermined pressure $PC_{TH}$ at Time t1, the motor generator 12 starts the assist operation, so that the assist output WA becomes a predetermined value W1.

When the assist operation is started, the quantity of discharge of the main pump 14, Q, increases at the same rate of increase from Time t1 to Time t3 as from Time t0 to Time t1. This is because the pump horsepower may be increased beyond the maximum value of the engine output. As a result, both the boom angle α and the bottom pressure PC increase from Time t1 to Time t3.

After the start of the assist operation, when the boom angle α reaches the predetermined angle α2 at Time T3, the quantity of discharge of the main pump 14, Q, decreases to reach Q1 by control of the regulator 14A, and the assist operation is stopped after passage of a predetermined period of time since Time t3. As a result, the boom angle α slowly increases at a rate lower than before Time t3, and the bottom pressure PC remains at the same value as at Time t3. Further, with the decrease of the quantity of discharge Q, the pump horsepower decreases to a level corresponding to the maximum value of the engine output (see (b) and (c) of FIG. 5).

Thereafter, when the boom operating lever is operated in the direction of the neutral position at Time t4, the boom raising pilot pressure PL becomes less than the predetermined pressure $PL_{TH}$. Further, the boom angle α is maintained at the angle at Time t4, the bottom pressure PC returns to the level before operating the boom operating lever in the boom raising direction, and the quantity of discharge Q decreases to a flow rate less than Q1. (For example, this flow rate is a minimum flow rate adopted when the hydraulic actuators are not in operation.)

The above-described configuration allows the shovel according to the first embodiment to move the attachment more smoothly during the boom raising motion and to prevent reduction in working efficiency by causing the motor generator 12 to start the assist operation in the case of detecting the start of a high-load boom raising motion.

Further, the shovel according to the first embodiment makes it possible to prevent the rising speed of the boom 4 from being restricted during a high-load boom raising motion and thereby to prevent an operator from feeling tardiness by causing the motor generator 12 to start the assist operation.

Further, the shovel according to the first embodiment causes the motor generator 12 to perform the assist operation after detecting the start of a high-load boom raising motion. Therefore, it is possible to prevent an unnecessary assist operation (such as an assist operation in the case of a low operational load) from being performed.

Further, in the first embodiment, the case is illustrated where the motor generator 12 is caused to start the assist operation in response to detection of the start of a high-load boom raising motion. However, if the assist operation has already been started before the start of a high-load boom raising operation, the assist output of the motor generator 12 may be further increased in response to detection of the start of a high-load boom raising motion. This makes it possible to further increase the horsepower of the main pump 14 and therefore make the motion of the attachment during the boom raising motion far less likely to be restricted.

[Second Embodiment]

Figure 7:
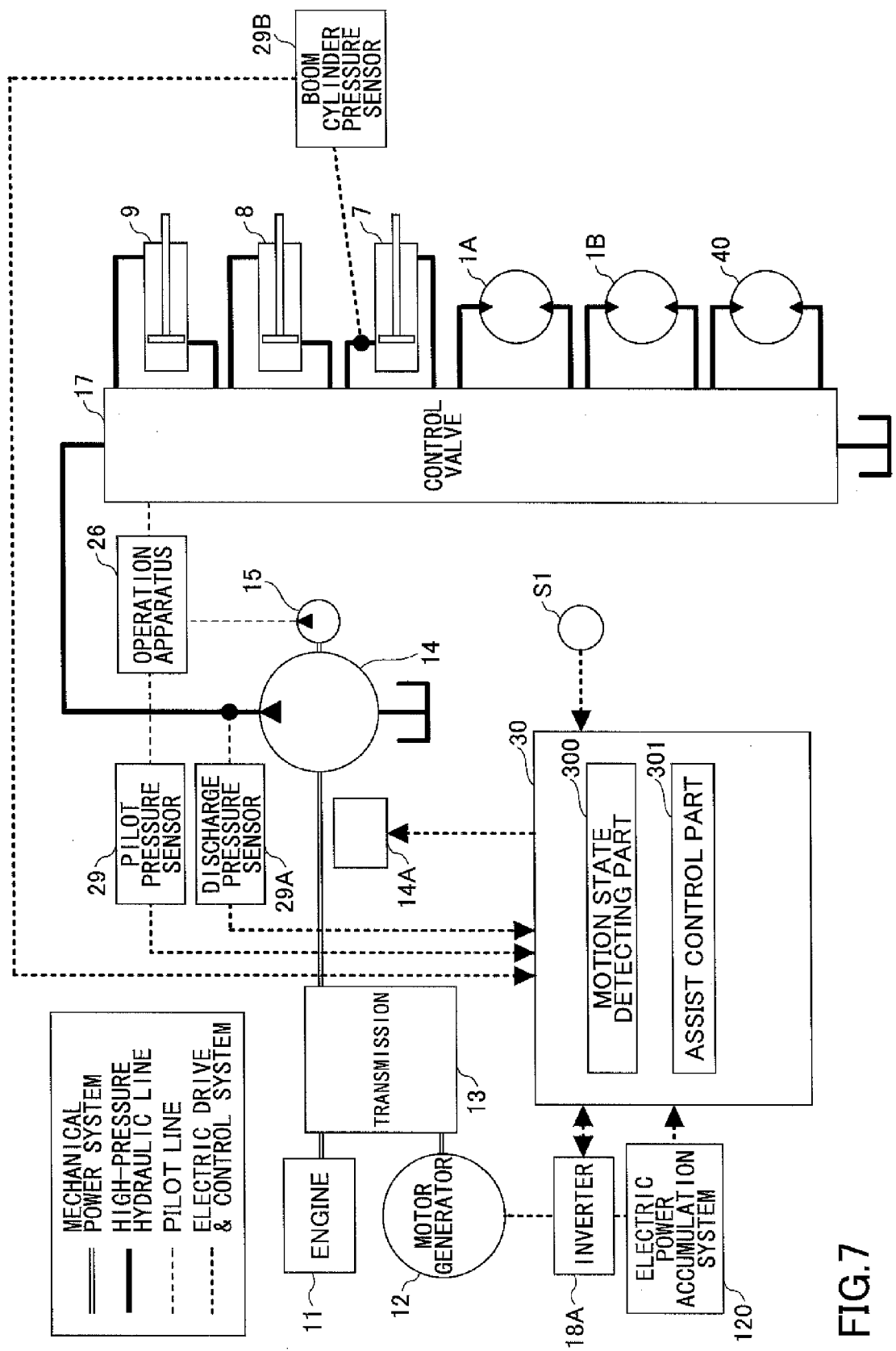
FIG. 7 is a block diagram illustrating a configuration of a drive system of a shovel according to a second embodiment of the present invention.

Next, a description is given, with reference to FIG. 7, of a configuration of a drive system of a shovel according to a second embodiment.

FIG. 7 is a block diagram illustrating a configuration of a drive system of a shovel according to the second embodiment. Like in FIG. 3A, in FIG. 7, a double line, a solid line, a broken line, and a dotted line indicate a mechanical power system, a high-pressure hydraulic line, a pilot line, and an electric drive and control system, respectively.

The drive system of FIG. 7 is the same as the drive system of FIG. 3A except for including a turning hydraulic motor 40 in place of the turning electric mechanism. This configuration allows the shovel of the second embodiment to produce the same effects as the shovel of the first embodiment.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:

1. A shovel, comprising:
an engine;
a hydraulic pump driven by the engine;
an attachment including a boom, the attachment being driven with hydraulic fluid discharged by the hydraulic pump;
a motor generator configured to assist driving by the engine;
an electric power accumulating part configured to accumulate electric power generated by the motor generator;
a motion state detecting part configured to detect a motion state of the attachment; and
an assist control part configured to control execution of an assist by the motor generator using the electric power accumulated in the electric power accumulating part,
wherein the motion state detecting part is configured to determine whether the motion state of the attachment is a boom raising motion after an excavation motion, and
the assist control part is configured to cause the motor generator to assist the engine during the boom raising motion after the excavation motion when the motion state detecting part determines that the motion state of the attachment is the boom raising motion after the excavation motion.

2. The shovel as claimed in claim 1, further comprising:
a load pressure sensor configured to detect an operational load applied to the boom,
wherein the motion state detecting part is configured to determine that the motion state of the attachment is the boom raising motion after the excavation motion in response to a load pressure value detected by the load pressure sensor being more than a predetermined pressure.

3. The shovel as claimed in claim 1, further comprising:
a boom motion detecting part configured to detect a motion state of the boom,
wherein the motion state detecting part is configured to determine that the motion state of the attachment is the boom raising motion after the excavation motion based on a value detected by the boom motion state detecting part.

4. The shovel as claimed in claim 1, further comprising:
an operating state detecting part configured to detect an operation of an operation apparatus for operating the attachment,
wherein the motion state detecting part is configured to determine that the motion state of the attachment is the boom raising motion after the excavation motion based on a value detected by the operating state detecting part.

5. The shovel as claimed in claim 1, wherein the assist control part is configured to cause the motor generator to assist the engine in a boom raising and turning motion.

6. A method of controlling a shovel, comprising:
controlling a motor generator assisting driving of a hydraulic pump by an engine, the assisting using an electric power generated by the motor generator and accumulated in an electric power accumulating part; and
determining whether a motion state of an attachment including a boom is a boom raising motion using hydraulic fluid discharged by the hydraulic pump after an excavation motion,
wherein said controlling causes the motor generator to assist the engine during the boom raising motion after the excavation motion when said determining determines that the motion state of the attachment is the boom raising motion after the excavation motion.

7. The method of controlling a shovel as claimed in claim 6, further comprising:
detecting an operational load applied to the boom,
wherein said determining determines that the motion state of the attachment is the boom raising motion after the excavation motion in response to a pressure value corresponding to the detected operational load being more than a predetermined pressure.

8. The method of controlling a shovel as claimed in claim 6, further comprising:
detecting a motion state of the boom,
wherein said determining determines that the motion state of the attachment is the boom raising motion after the excavation motion based on the detected motion state of the boom.

9. The method of controlling a shovel as claimed in claim 6, further comprising:
detecting an operation of an operation apparatus for operating the attachment,
wherein said determining determines that the motion state of the attachment is the boom raising motion after the excavation motion based on the detected operation of the operation apparatus.

10. The method of controlling a shovel as claimed in claim 6, wherein said controlling causes the motor generator to assist the engine in a motion of raising and turning the boom.

11. A shovel, comprising:
an engine;
a hydraulic pump driven by the engine;
an attachment including a boom, the attachment being driven with hydraulic fluid discharged by the hydraulic pump;
a motor generator configured to assist driving by the engine;
an electric power accumulating part configured to accumulate electric power generated by the motor generator;
a motion state detecting part configured to detect a motion state of the attachment;
an assist control part configured to control execution of an assist by the motor generator using the electric power accumulated in the electric power accumulating part; and
a load pressure sensor configured to detect an operational load applied to the boom,
wherein the assist control part is configured to cause the motor generator to assist the engine in response to a load pressure value detected by the load pressure sensor being more than a predetermined pressure during a boom raising motion after an excavation motion.

12. The shovel as claimed in claim 11, further comprising:
a boom motion detecting part configured to detect a motion state of the boom,
wherein the assist control part is configured to cause the motor generator to assist the engine in response to the load pressure value detected by the load pressure sensor being more than the predetermined pressure when the motion state detecting part detects the boom raising motion based on a value detected by the boom motion state detecting part.

13. The shovel as claimed in claim 11, further comprising:
an operating state detecting part configured to detect an operation of an operation apparatus for operating the attachment,
wherein the assist control part is configured to cause the motor generator to assist the engine in response to the load pressure value detected by the load pressure sensor being more than the predetermined pressure when the motion state detecting part detecting the boom raising motion based on a value detected by the operating state detecting part.

14. The shovel as claimed in claim 11, wherein the assist control part is configured to cause the motor generator to assist the engine in a boom raising and turning motion.

15. A method of controlling a shovel, comprising:
controlling a motor generator assisting driving of a hydraulic pump by an engine, the assisting using an electric power generated by the motor generator and accumulated in an electric power accumulating part; and
detecting an operational load applied to the boom,
wherein said controlling causes the motor generator to assist the engine in response to a pressure value corresponding to the detected operational load being more than a predetermined pressure during a motion of raising a boom included in an attachment using hydraulic fluid discharged by the hydraulic pump after an excavation motion.

16. The method of controlling a shovel as claimed in claim 15, further comprising:
detecting a motion state of the boom,
wherein said controlling causes the motor generator to assist the engine in response to the pressure value corresponding to the detected operational load being more than the predetermined pressure in a case of detecting the motion of raising the boom based on the detected motion state of the boom.

17. The method of controlling a shovel as claimed in claim 15, further comprising:
detecting an operation of an operation apparatus for operating the attachment,
wherein said controlling causes the motor generator to assist the engine in response to the pressure value corresponding to the detected operational load being more than the predetermined pressure in a case of detecting the motion of raising the boom based on the detected operation of the operation apparatus.

18. The method of controlling a shovel as claimed in claim 15, wherein said controlling causes the motor generator to assist the engine in a motion of raising and turning the boom.

* * * * *